US011018492B2

(12) United States Patent
Lipke et al.

(10) Patent No.: US 11,018,492 B2
(45) Date of Patent: May 25, 2021

(54) COMMUNICATIONS NETWORK POWER PROVISION SENSING, MONITORING AND CONTROL

(71) Applicant: Leviton Manufacturing Co., Inc., Melville, NY (US)

(72) Inventors: Dean Lipke, Mill Creek, WA (US); Jennifer Yanni, Seattle, WA (US); William Lauby, Mukilteo, WA (US); Jeffrey Alan Poulsen, Bothell, WA (US); Frank Chin-Hwan Kim, Bothell, WA (US)

(73) Assignee: LEVITON MANUFACTURING CO., INC., Melville, NY (US)

( * ) Notice: Subject to any disclaimer, the term of this patent is extended or adjusted under 35 U.S.C. 154(b) by 418 days.

(21) Appl. No.: 15/937,548

(22) Filed: Mar. 27, 2018

(65) Prior Publication Data

US 2018/0294636 A1     Oct. 11, 2018

Related U.S. Application Data

(60) Provisional application No. 62/483,240, filed on Apr. 7, 2017.

(51) Int. Cl.
*H02H 3/08* (2006.01)
*H04L 12/10* (2006.01)
*H02H 1/00* (2006.01)

(52) U.S. Cl.
CPC ............ *H02H 3/08* (2013.01); *H02H 1/0007* (2013.01); *H04L 12/10* (2013.01)

(58) Field of Classification Search
CPC .. H02H 1/0007; H02H 1/0038; H02H 1/0061; H02H 1/0092; H02H 1/06;
(Continued)

(56) References Cited

U.S. PATENT DOCUMENTS 8,555,341 B2    10/2013  Ametsitsi
2010/0198535 A1*  8/2010  Brown ................. G01R 22/063
                                                          702/62

(Continued)

OTHER PUBLICATIONS

"Evocords and patchcords" Mertek Industries. [mertekjcs.com], retrieved on Sep. 13, 2018, 1 page.
(Continued)

*Primary Examiner* — Matthew V Nguyen
(74) *Attorney, Agent, or Firm* — Amin, Turocy & Watson, LLP

(57) ABSTRACT

Embodiments of the present disclosure provide techniques and configurations for a communications network with data and power provision over communication channels. In some embodiments, the network may comprise a network control apparatus having a plurality of communication channels, to connect one or more devices with the network, wherein the network control apparatus is to provide data communications between a device of one or more devices and the network via a communication channel, and to provide power to the device via the communication channel. The network may further comprise a power management block coupled with the network control apparatus, to control the provision of power to the device of the one or more devices, which may include determining whether the communication channel carries a power level in excess of a threshold associated with the communication channel.

20 Claims, 10 Drawing Sheets

(58) Field of Classification Search
CPC .. H02H 3/08; H02H 3/10; H02H 3/20; H02H 3/42; H04L 12/02; H04L 12/10
See application file for complete search history.

(56) References Cited

U.S. PATENT DOCUMENTS

2016/0370835 A1* 12/2016 Erickson ............... G06F 13/385
2019/0227608 A1*  7/2019 Chen .................... G06F 1/28
2020/0044874 A1*  2/2020 Xu ...................... G06F 1/266

OTHER PUBLICATIONS

Horak, Ray. "Mertek EV06: Why didn't I think of that?" Telecom Reseller. [mertekjcs.com], retrieved on Sep. 13, 2018, 1 page.
"Callpilot and mgate adapter" Mertek Industries. [mertekjcs.com], retrieved on Sep. 13, 2018, 1 page.
"CallPilot MPB96 and MGate Updates—New MGate RJ-45 to Amphenol Adapter" Nortel Product Bulletin dated Mar. 3, 2009, [mertekjcs.com], retrieved on Sep. 13, 2018, 12 pages.

* cited by examiner

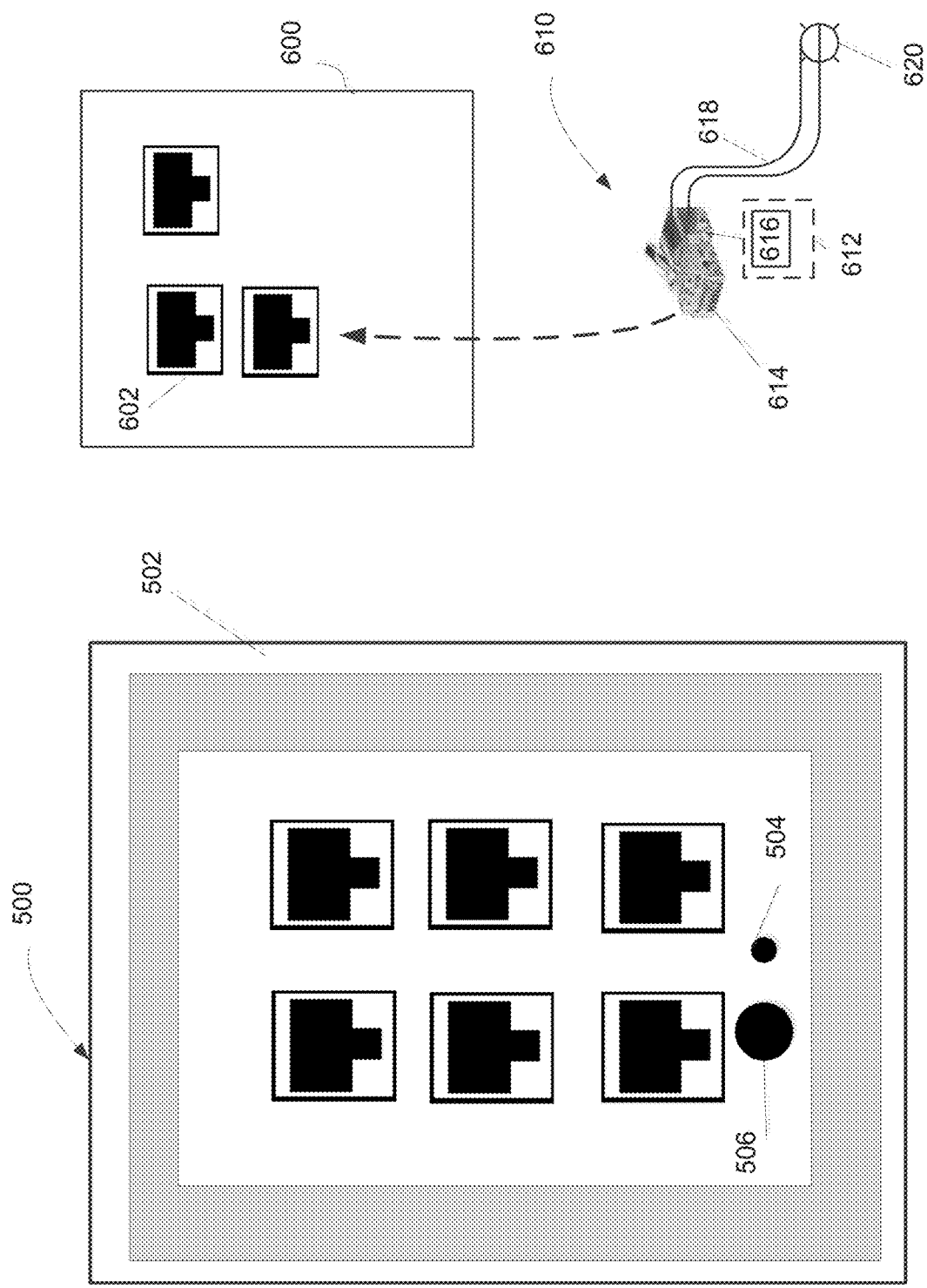

COMMUNICATIONS NETWORK POWER PROVISION SENSING, MONITORING AND CONTROL

RELATED APPLICATION

The subject application claims priority to U.S. Provisional Patent Appln. No. 62/483,240, filed Apr. 7, 2017, and entitled, "COMMUNICATIONS NETWORK POWER PROVISION SENSING, MONITORING AND CONTROL," the entirety of which application is hereby incorporated by reference herein.

FIELD

Embodiments of the present disclosure generally relate to the field of network power management, and more particularly, to sensing, monitoring and controlling power provision via the network communication channels configured to deliver data and power to devices connected to the network.

BACKGROUND

As power over network cable, and the applications for power over network cable (e.g. power over Ethernet (POE); power over HDBaseT (POH); collectively "Power Over Cable" or POC) and capabilities evolve, there is a high probability the network (e.g., local area network (LAN)) may provide different power levels to the various devices connected with the network. And, with the advent of the transmission of higher levels of power over cabling for telecommunications applications, the level of current applied to structured cabling has increased. Current standards for power over structured cabling allow for increments of 15 watts, 30 watts, 60 watts, 100 watts and 100+ watts. Under fault conditions, this current may increase up to 200 watts.

Depending on the type of cabling and method of installation, safe handling of the actual levels of applied current may not always be achieved. For example, using multiple cables in a bundle or close grouping may lead to unintentional overheating of the bundled cables if high current levels are applied to one or more cables in the group. Further, when multiple powered devices are deployed in the network, where each device on the network may require different power levels to function properly, real-time visibility to power carrying capabilities and power consumption over the network may not always be available to effectively manage and control power provision and consumption in the network. Another existing challenge is the dynamic and ever-changing structured cabling environment with new powered devices being introduced to, or removed from, a network on an ad hoc and frequent basis which may lead to mismatches in the physical connectivity systems and networked powered devices.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIGS. 3-6 illustrate various examples of communication network outlets for data and power provision, configured with power presence indicators, in accordance with some embodiments.

DETAILED DESCRIPTION

Some embodiments of the present disclosure may include techniques and configurations for a data communications network with power provision and centralized or distributed power sensing, management and control. In some embodiments, the network may comprise one or more centralized or distributed control means for the sensing and management of power within the one or more communication channels (e.g. cables; connectors; devices) connecting the devices with the network. Such centralized or distributed power sensing, management and control may include determining whether a communication channel carries a power level in excess of a threshold associated with the communication channel or networked device.

The network may further comprise a notification system to advise managers and users of power levels in excess of thresholds associated with a communication channel as well as centralized or distributed means to control, limit or terminate power supply to avoid damaging various components of the communication channel Such control, limit or termination of power supply may have a software-based automatic shut-off and/or resettable component as well as a manual shut-off and/or resettable and/or replacement option built into the network in the event of excess power levels in one or more communication channel.

In some embodiments, a communication channel may include a wall plate assembly which may be configured to indicate (e.g. visual indicator; auditory indicator) the presence or absence of power in the communication channel A communication channel may include a circuit protection device disposed somewhere along the communication channel (e.g. proximate or within a cable or cable component, or proximate or within a connector or connector component) to open a circuit along the communication channel in response to certain parameters such as current overload or excess heating within the communication channel Overload (overcurrent) may mean that the communication channel carries a power level that is in excess of a threshold associated with the communication channel.

Figure 1:
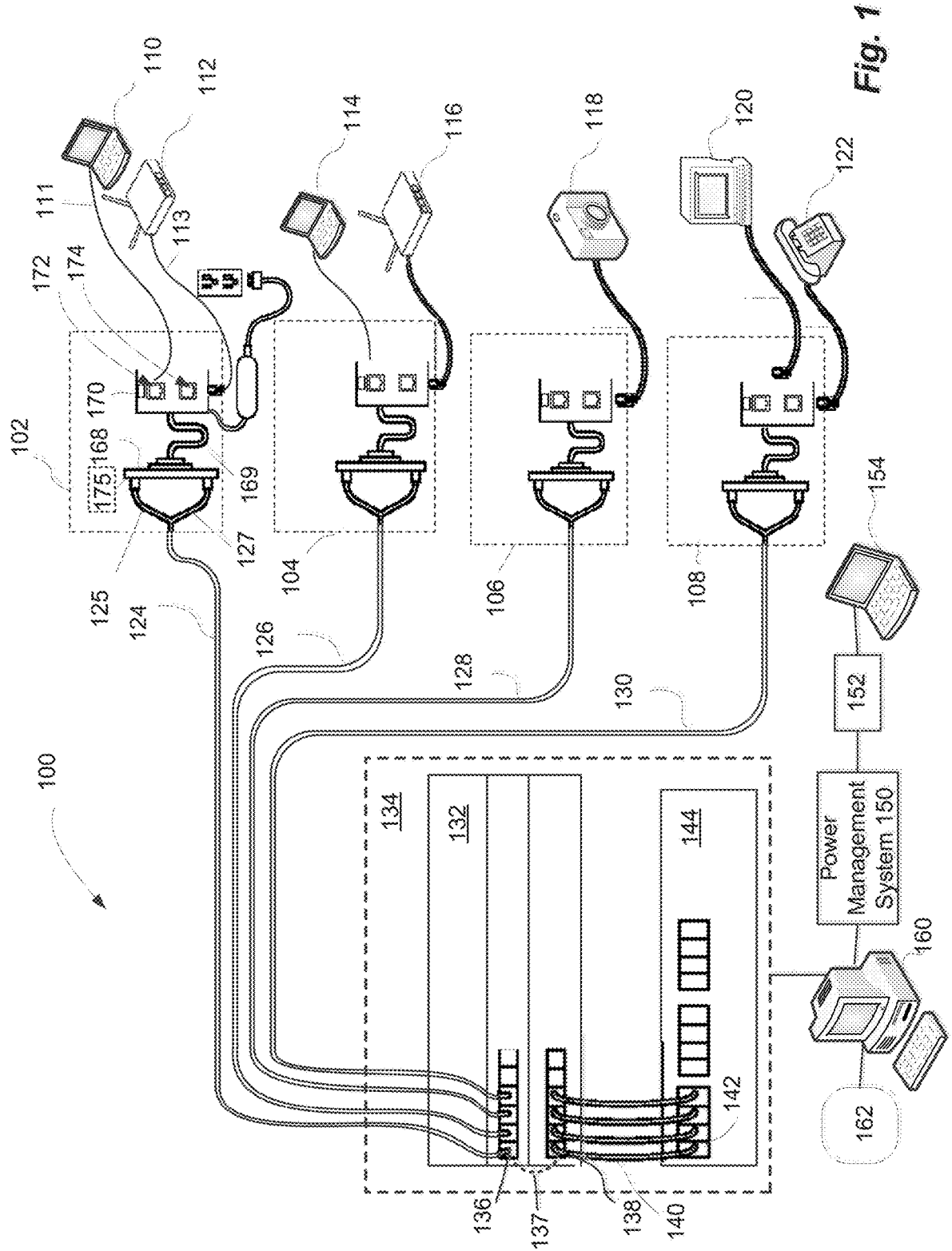
FIG. 1 illustrates an example communications network in accordance with some embodiments.

FIG. 1 illustrates an example communications network 100 in accordance with some embodiments. The network 100 may be configured to provide both data communication capabilities and power to devices connected with the network 100 over one or more communication channels. For example, the network 100 may be a LAN and/or may have POC (e.g. POE; POH) capabilities.

As shown in FIG. 1, the network 100 may include one or more wall plate assemblies 102, 104, 106, 108 through which devices of various types (e.g. 110, 112, 114, 116, 118, 120, 122) may be connected to the network 100. The wall plate assemblies 102-108 may be installed around an area in which the network 100 is implemented e.g., conference rooms, offices, or other areas of a networked facility.

Devices of various types, such as devices 110-122, are shown in FIG. 1 for purposes of illustration and are not limiting in this disclosure. In general, devices 110-122 may include any computing, communication, or other types of devices, such as routers, cameras, workstations, phones, laptop or tablet computers, desktop computers, projectors, game consoles, or the like. Each of these devices 110-122 may be pluggable into corresponding wall plate assemblies 102-108 via respective connectorized cables such as cables 111 and 113 for devices 110, 112, respectively.

As shown in FIG. 1, the wall plate assemblies 102-108 may be comprised of wall plates 170 having one or more connectors (e.g. receptacles; jacks; fiber optic connectors; adapters) 172, 174 disposed therein and wall plate circuitry 168 disposed within wall plate 170 that may be electrically coupled to wall plate 170 via a patching cable 169. The term "receptacle" is used herein to mean a female connector, which may include not only outlets (e.g., female connectors such as RJ-45 Jack), but may also include an adapter to receive fiber optic connectors at opposing ends. The wall plate circuitry 168 may also have battery back-up 175 to ensure continuous supply of power to the wall plate circuitry 168. The wall plate circuitry 168 may be configured to perform various functions including power sensing, monitoring, management and termination as well as power status display functions as will be described further below.

The network 100 may further include a centralized or distributed network control and notification means, shown in centralized form as network controller 134 in FIG. 1, to provide sensing, control, management and/or termination, as appropriate, of data and power transmitted within one or more communication channels of network 100. In some embodiments, the centralized network control apparatus 134 may be contained in, for instance, a network equipment rack disposed in the networked facility, while a non-centralized, distributed network control means may be disposed throughout network 100 and the various communication channels. The devices 110-122 may be connected with the network control and notification means, such as network controller 134, via the connectors 172, 174 of respective wall plate assemblies 102-108 via one or more connectorized cabling structures 124 (comprised of, for instance, sub-cables 125, 127 coupled to wall plate circuitry 168), 126, 128 and 130.

More specifically, the network control and notification controller 134 may include a patch panel 132 (e.g. mid-span; end-span) into which are disposed connectors 136 (e.g. jacks; fiber optic connectors; adapters) configured to couple to connectorized cables 124, 126, 128 and 130 through various transmission media e.g. copper cabling; optical fibers. Connectors 136 may be coupled to various other connectors (e.g. 142) by means of patching cables (e.g. 137) to other components of the network 100 including, for instance, a switch 144 for further control, sensing, management, notification and termination of data and power distribution within the communication channels of the network system 100. For example, the network switch 144 may inspect data packets that are received from one of the devices 110-122, or an external device via the Internet or other external network coupled to the switch 144, to determine a source and destination address of each packet, and route the packets accordingly. As shown in FIG. 1, patch cables (e.g., 137, 140) may interconnect each connector (e.g., 136) on the patch panel 132 to a corresponding connector (e.g., 142) of the network switch 144.

In embodiments, the network 100 may be configured, in addition or in the alternative to facilitating communications between devices 110-122 and their counterparts via communication channels, to also provide power to devices 110-122 via the communication channels. Network power management presents a dynamic environmental ecosystem which can include mismatches in the physical system and end point powered devices, which may require not only identification and notification of changes in power levels or physical configurations, but the capacity to limit or terminate power to one or more communication channels of network 100. Such control, limit or termination of power supply within network 100 may utilize a software-based automatic shut-off and/or resettable component as well as a manual shut-off and/or resettable option incorporated within one or more communication channels comprising network 100 in the event power levels exceed pre-set values or an end-user ascertains the need for intervention.

For example, network 100 may comprise, for instance, an Ethernet network which is also capable of providing POC (e.g. POE; POH). More specifically, power may be provided by the network control apparatus 134 to devices 110-122 via cables 124, 126, 128 and 130, respectively. The switch 144 may be configured to store information about data transmission and power supply to devices 110-122. At least some of the devices 110-122 deployed in the network 100 may require different power levels to function properly. For example, if the network control and notification controller 134 supplies power of incorrect level (e.g., exceeds capacity or requirements) to one or more of the devices 110-122, the respective devices and corresponding cable structures may be overheated, overloaded, or otherwise damaged.

In some embodiments, the network control and notification apparatus 134 may include, or couple with, a power management system 150 comprised of centralized or distributed components. For example, the power management system 150 may be communicatively coupled via one or more communication channels to manage and control power supply to the devices 110-122. More generally, the power management system 150 may identify the power transmission capacity of one or more communication channels, monitor the power level in such channel or channels, and compare actual power supply to the designated power capacity of such communication channel or channels. This sensing and monitoring function by power management system 150 may be centralized (as shown in FIG. 1) or distributed throughout network 100 at, for instance, the level of a cable, a plug, a jack, a wall plate, a patch panel, or at a switch. For example, the monitoring may be incorporated in the patch panel 132 or at a wall plate 170 with a simple LCD readout or LED indicator that may show level of power capability versus power provided or in use, such as a power volume level indicator with multiple LEDs in a stack.

Connectors such as 172 incorporating sensing, logic and communication electronics may provide local sensing, control, management and termination of data and power being transmitted to an attached device and may communicate back through the network cables 124 to the power management system, or to other devices on the network to signal, limit, indicate or otherwise manage power at other ports or locations within a facility. For example, a device might request a power level that cannot be supported by the system in conjunction with other devices drawing power in the facility or the power level may exceed the capability of the specific connector itself. In this situation, the connector 172 incorporating sensing and control components would locally terminate power or adjust power level appropriately for the system capability or for its own power conduction capability. Separately or simultaneously the connector may communicate over the network to the power management system 150 or to other connectors, ports or devices its current state and control settings so the power management system as well as other ports on the network are aware of its condition and can also interact appropriately. In an equivalent manner, the sensing, logic and communication electronics may be incorporated into the wall plate or into the cable connector or plug, or even into the cable assembly itself at one or more points along its length enabling the creation of a modular distributed network control mesh capable of supporting either a centralized or distributed network power control scheme.

The centralized or distributed power management system 150 may also provide mapping of the power levels of the physical configuration and infrastructure of the structured cabling system of network 100 including the power carrying capabilities to meet the power needs of one or more specific devices 110-122. For example, the power management system 150 may identify and document the connectivity along the various communication channels throughout the network 100. This sensing, monitoring and management function may identify one or more of the communication channels as having a verified power carrying capability and may include a notice function in the event of excess power levels anywhere throughout the network 100.

Figure 15:
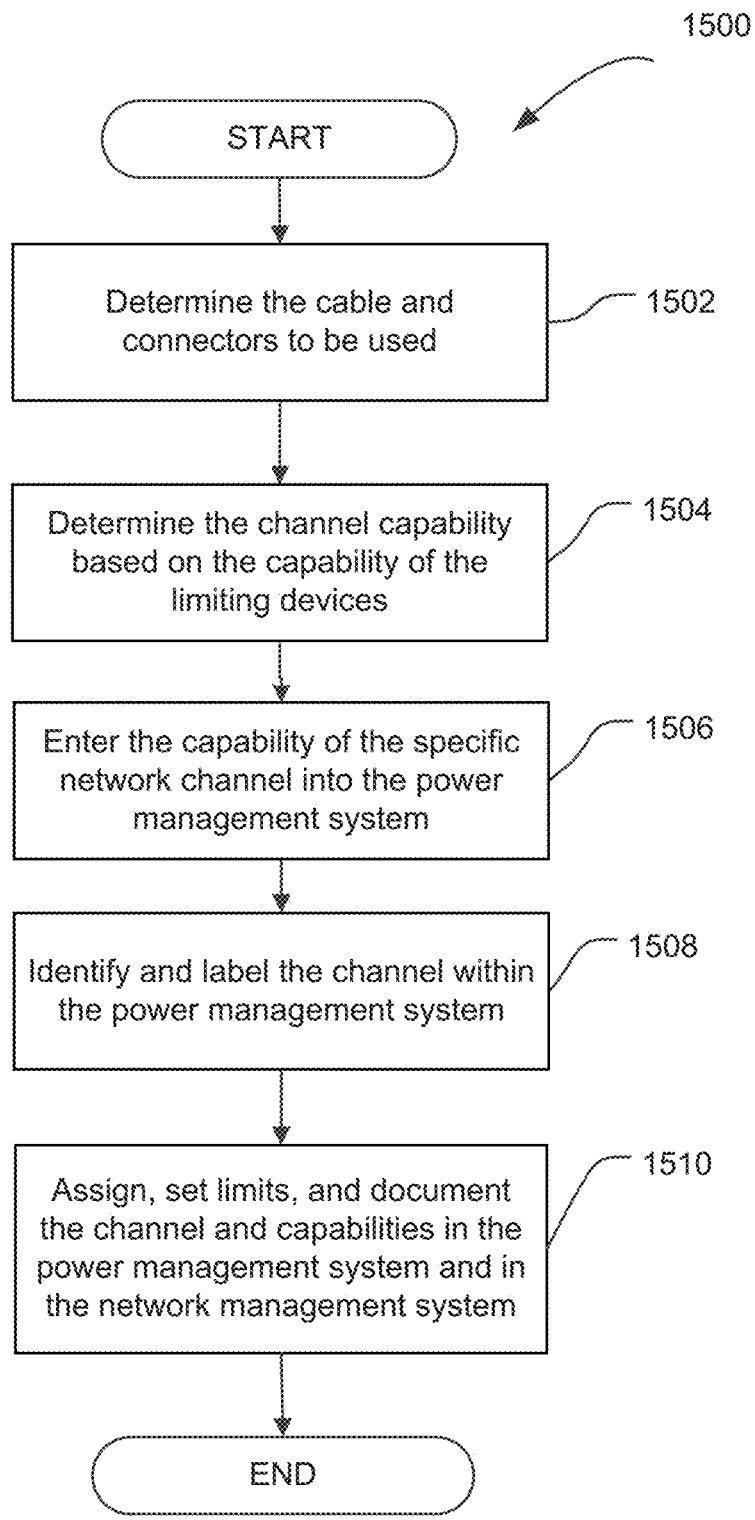
FIG. 15 is an example process flow diagram for the mapping of power levels of the physical configuration and infrastructure of the structured cabling system in accordance with some embodiments.

FIG. 15 is an example process flow diagram 1500 to map power levels of the physical configuration and infrastructure of the structured cabling system of network 100. The process 1500 may include at least the following steps. At block 1502, determine the cable and connectors to be used (e.g. cables, patch cords, connectors, plugs and the like). At block 1504, determine the channel capability based on the capability of the limiting device(s) (e.g. cables, patch cords, connectors, plugs and the like). At block 1506, enter the capability of the specific network channel into the power management system. At block 1508, identify and label the channel within the power management system. At block 1510, assign, set limits, and document the channel and capabilities both in the power management system and in the network management system.

In some embodiments, the power management system 150 may be configured to monitor connector status and manage network changes, capabilities and associated risks by preventing the delivery of incorrect power levels to one or more devices 110-122, and monitoring plugging in and un-plugging of the devices to and from the network 100. In some embodiments, the power management system 150 may comprise a software solution residing on or accessible by a computing device 160 (see FIG. 1) coupled with the network control and notification apparatus 134. As the power management system 150 monitors and manages the power levels, status, and changes, it communicates that information to the network management system including, but not limited to, one or more of the network controller 134, switch 144 or computing device 160.

Specifically, with respect to managing network changes and monitoring port status, in embodiments, the power management system 150 may include, or couple with, an application 152 (see FIG. 1) that may provide an interface to power management system 150, e.g., a web browser or other means. The application 152 may reside on one or more computing devices such as computing device 154 (see FIG. 1) e.g. a smartphone, tablet, desktop computer, laptop computer. These computing devices 154 may be accessible by network support personnel to monitor network activities related to power provision to devices connected to the network 100.

With respect to management of the various connectivity elements of the communication channels of network 100, such as cables, ports, connectors, adapters and the like (collectively "connectivity elements"), the power management system 150 may be further configured to monitor the status of such connectivity elements, either individually or by various groupings (e.g. per communication channel; per physical location) and track the power levels being carried across such connectivity elements, providing real-time visibility to the various power levels and amount of power being consumed across the network 100. For example, the power management system 150 may monitor the number of power-enabled (e.g., POE. POH) connectors in a facility, the number of power-enabled connectors currently in use, the number of power-enabled connectors broken out by power levels, and total power consumed by devices currently connected with one or more of the communication channels of the network 100. The power management system 150 may control power distribution on one or more communication channels of the network 100 based, for example, on information about allowed power levels associated with specific network components, such as cables 124-130, wall plate assemblies 102-108, and other connectivity elements. Such information may be stored in, for example, a memory 162 accessible by the computing device 160 (see FIG. 1). The power management system 150 may also identify one or more communication channels carrying loads in excess of the power carrying capacity of each specific communication channel and may provide real or near-real time notifications to users about equipment or devices within network 100 coupled to a channel carrying a load beyond its power carrying capacity.

Figure 2:
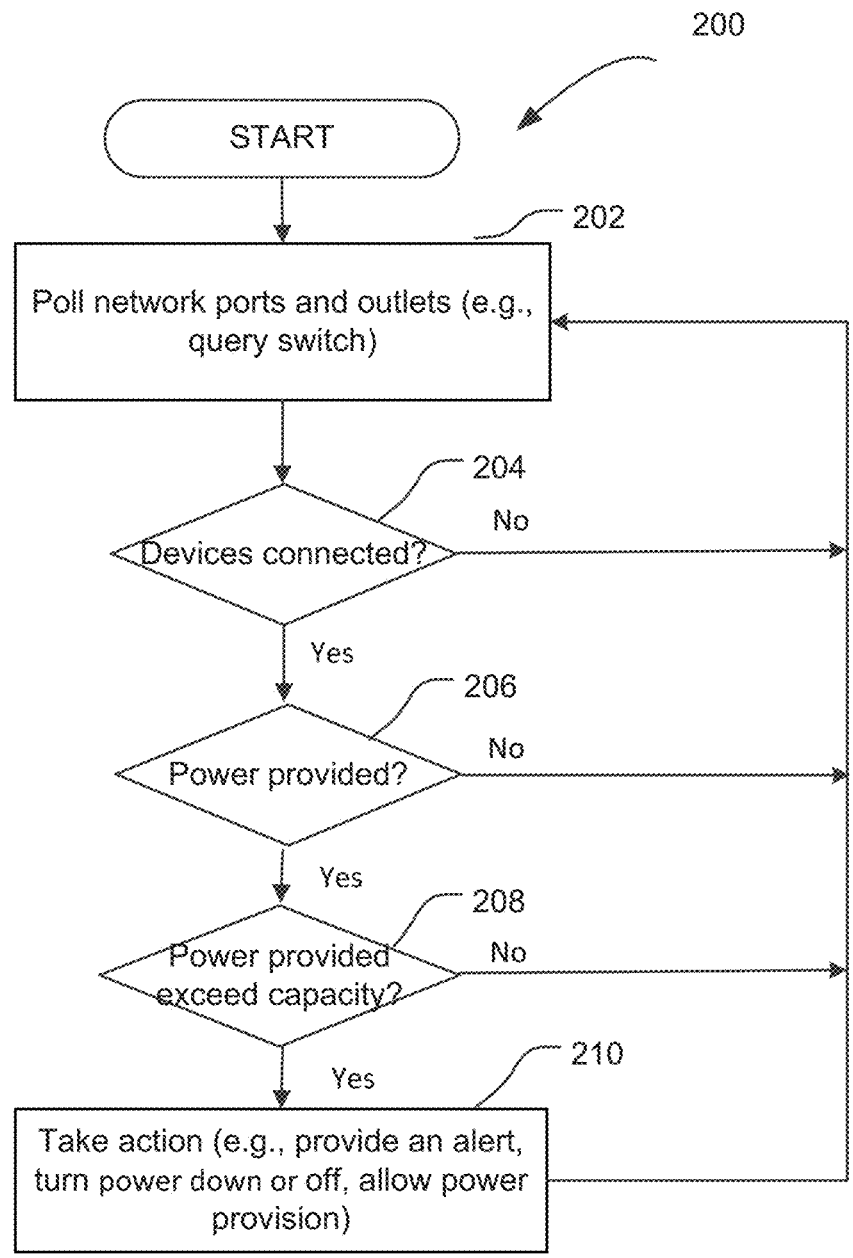
FIG. 2 is an example process flow diagram for monitoring power provision in a communication network in accordance with some embodiments.

FIG. 2 is an example process flow diagram to monitor power provision in a network 100 in accordance with some embodiments. More specifically, the process 200 illustrates monitoring and controlling power supply across the network 100 of FIG. 1. Accordingly, the process 200 will be described with continuing reference to FIG. 1. The process 200 may be performed, for example, by the power management system 150 of FIG. 1.

The process 200 may begin at block 202 and include polling connectivity elements such as ports, connectors, adapters and cables of one or more communication channels of a communication network such as network 100. In some embodiments, the power management system 150 may poll, continuously or periodically, various connectivity elements, such as the connectors 142 of the switch 144, to identify the connectivity status. The connectivity status may include information about connector usage (e.g., connected to one of the devices 110-122), power supply to the device (if connected), and whether supplied power exceeds the capacity of components comprising the connection of the device to the patch panel 132 and switch 144, namely, an ability of the corresponding cable, port, connector, adapter and/or wall plate outlet to sustain the provided power level without overheating or other damage.

At decision block 204, the process 200 may include determining whether one or more of the devices 110-122 are connected to the network 100, e.g., via patch panel 132 and switch 144. If no devices are determined to be connected to the network 100, the process 200 may return to block 202. If at least one device is determined to be connected to the network 100, the process 200 may move to decision block 206.

At decision block 206, the process 200 may include determining whether power is provided via the network 100 to any of the connected devices 110-122. If no power (e.g., POE, POH) is provided to any of the connected devices, the process 200 may return to block 202. If at least one device is determined to be powered through the network 100, the process 200 may move to decision block 208.

At decision block 208, the process 200 may include determining whether power provided via the network 100 to at least one of the connected devices 110-122 exceeds the network (or its connectivity elements) capacity. If it is determined that the provided power does not exceed the capacity, the process 200 may return to block 202.

If it is determined that the provided power exceeds the capacity for at least one connection of a device to the network 100, at block 210 one or more actions may be initiated to mitigate possible effects of the provision of power at an excessive level. For example, the power management system 150 may issue an alert and provide the alert to be rendered for display on one or more associated applications 152 (e.g., residing on the computing device 154). In another example, the power management system 150 may initiate the action on the network (e.g., issue a command to the switch 144) to lower the power level below the excess level or turn the power off. In another example, the power management system 150 may initiate the action to upgrade the allowed power network for the port or connector. In some embodiments, a combination of one or more of the above actions may be initiated. For example, the power management system 150 may allow the network to provide the requisite power level to the device (even at excessive level), and/or notify personnel via the application 152 accordingly. In embodiments, the power management system 150 may also provide notification of excess power within network 100 to an end-user, re-set and/or turn-off power in specific communications channels or globally throughout network 100 in the event of excess power and/or provide a "Gate" function at the level of connector and/or cable that sets the network 100 to accept certain level of power and block the transmission of power that exceeds this power setting.

In some embodiments, in addition or in the alternative to power management techniques described above, the components of the communication network may include means for conveying the presence of power, such as indicators of various types, as well as means for protecting the corresponding circuits from excessive power levels (e.g., power levels that exceed the capacity of a particular component or components of the circuit). For example, communication channel components, such as wall plates, connectors and cables, may include indicators (e.g. visual indicators; auditory indicators) to indicate the presence or absence of power, different power levels, and the like. The communication channel components may further include means for protection of the channel from excessive power levels. Some of these embodiments will be described in reference to FIGS. 3-13. FIGS. 3-6 illustrate examples of communications network connectors for data and power provision, configured with power presence indicators, in accordance with some embodiments. In some embodiments, the connectors may include the wall plate assemblies 102-108 of FIG. 1. The wall plate assemblies 102-108 may include wall plates 170 also described in reference to FIG. 1. As described above, wall plate assemblies 102-108 may be included in a network with POC capabilities.

Figure 3:
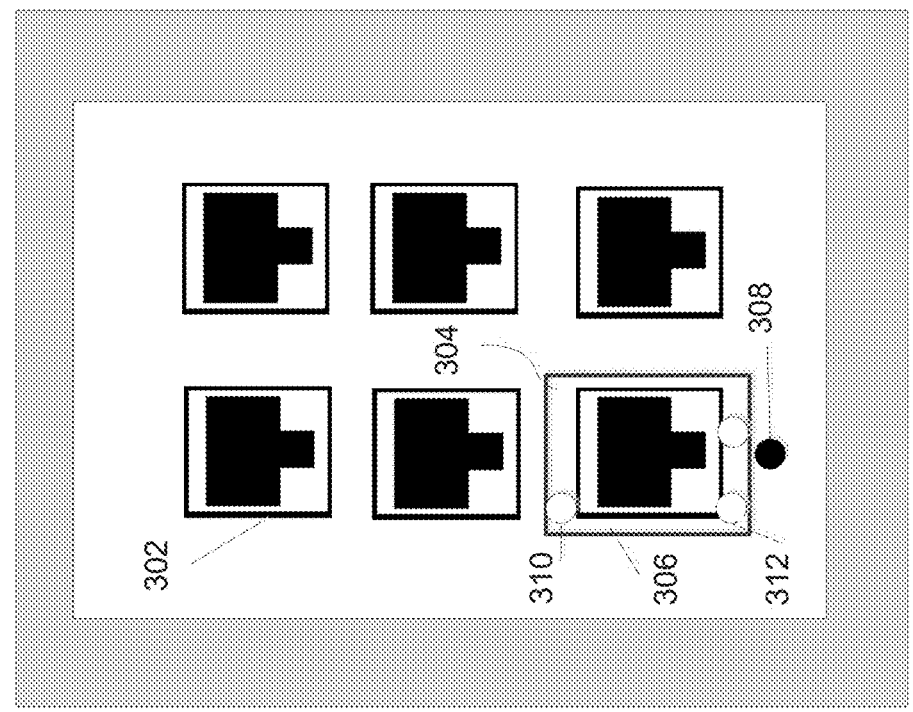

FIG. 3 illustrates an example wall plate 300 in accordance with some embodiments. The wall plate 300 may be disposed anywhere in a facility in which the network 100 is provided. For example, the wall plate 300 may be disposed in an office, a conference room, utility room, or the like. As shown, the wall plate 300 may include one or more connectors 302, 304 (e.g., receptacles, jacks, outlets, fiber optic connectors; adapters) of different configurations. Only two of the connectors 302, 304 present in wall plate 300 are numbered for purposes of simplicity. Also, while six connectors 302, 304 are shown in the wall plate 300, any number of connectors may be included in the wall plate, depending on desired network configuration. In some embodiments, the connectors 302, 304 may comprise RJ-45 jacks while in others they may be fiber optic connectors or adapters. The wall plate 300 may be a part of the wall plate assembly 102-108 described in reference to FIG. 1, such as wall plate 170. As shown, the wall plate 300 may have a bezel 306 disposed substantially around the connector 304. In some embodiments, the bezel 306 may comprise one or more lights 310, 312 (e.g., light emitting diodes (LED)) to indicate the presence of power in the outlet 304. In some embodiments, the bezel 306 may include multiple lights disposed around a frame of the bezel or inside the bezel, to light the bezel when the power is provided to the outlet 304 and/or to light a room when the sensed ambient light is below a threshold. Only one bezel is shown in FIG. 3 for ease of understanding. One or more connectors 302, 304 of the wall plate 300 may include respective bezels configured as described herein. Accordingly, the bezel 306 may perform at least a dual function: indicate presence of power in the connector 302, 304, and provide ambient light in a room in which the wall plate 300 is disposed, regardless of the power presence in the connector 302, 304. For example, the power to the bezel lights may be provided by the circuity 168 of the wall plate assembly 102-108 of FIG. 1 and/or powered by back-up battery 175.

In some embodiments, a light sensor 308 may be disposed on the wall plate 300, to sense light conditions. The sensor may be disposed anywhere on the wall plate 300, such as in proximity to the connector 304 (e.g., inside or outside the bezel 306), or elsewhere on the wall plate 300. In operation, the lights 310, 312 may be turned on (e.g., by wall plate assembly circuitry 168 shown in FIG. 1) when the ambient light sensed by the light sensor 308 falls below a predetermined threshold.

Figure 4:
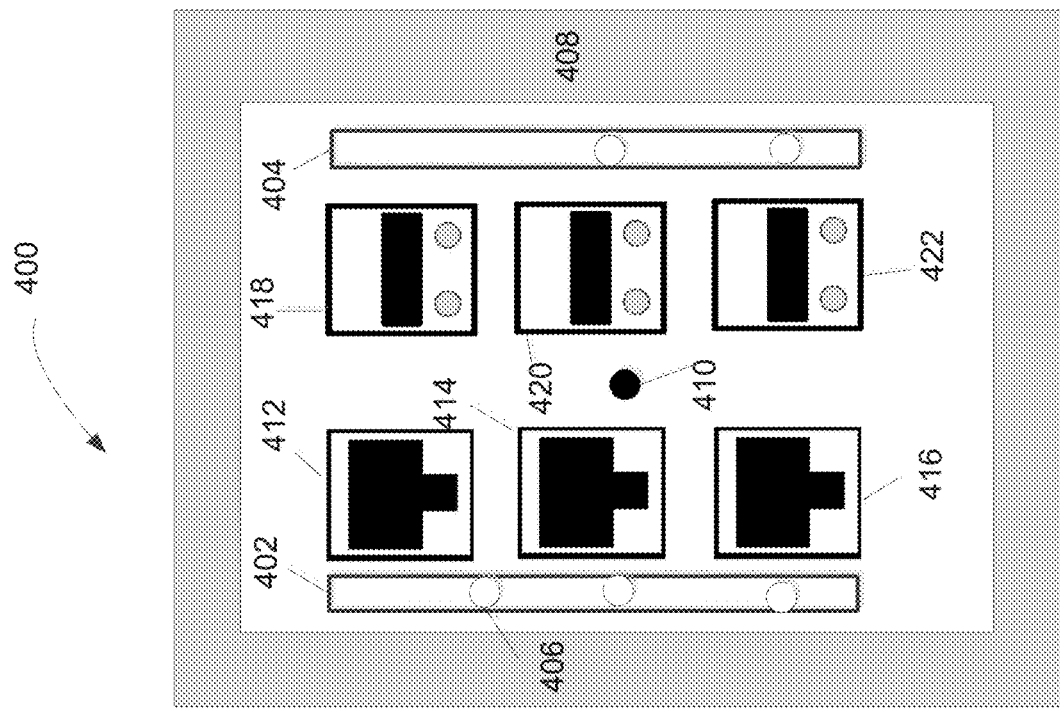

FIG. 4 illustrates another example wall plate 400, in accordance with some embodiments. The wall plate 400 may include one or more light components 402, 404 having lights 406, 408 (LED) to perform the power presence indication and/or lighting functions previously described. For example, the light components 402, 404 may be variously disposed proximate one or more of the several connectors 412, 414, 416, 418, 420, and 422, of the wall plate 400 respectively, as shown. The example disposition of the light components 402, 404 is shown for illustration only, and is not limiting to this disclosure. The light components 402, 404 may comprise various shapes including, but not limited to, rectangles such as the stripe-shaped light components 402, 404 shown in FIG. 4. In some embodiments, the wall plate 400 may include a light sensor 410 to sense the absence or presence of ambient light as described in reference to light sensor 308 in FIG. 3.

FIG. 5 illustrates another example wall plate 500 in accordance with some embodiments. As shown, the wall plate 500 may include a light component 502 disposed substantially around an edge of the wall plate 500. The light component 502 may include a light source (e.g. LED) and functions in a manner similar to light components 402, 404 described in reference to FIG. 4. In some embodiments, the wall plate 500 may include a light sensor 504 to sense the absence or presence of ambient light as described in reference to light sensor 308 for FIG. 3. In some embodiments, the wall plate 500 may further include a control 506 for manual adjustment of brightness and/or color of the light component 502. The control 506 may be coupled with the circuitry 168 of the wall plate assemblies 102-108 of FIG. 1.

In addition to the above-described uses, the embodiments described in FIGS. 3-5 may provide the following applications. For example, the brightness of the lights of the wall plates 300, 400, 500 may be adjusted manually (e.g., as described for FIG. 5) or remotely, e.g., via the application 152 (see FIG. 1). The color of the lights may likewise be selected manually or via the application 152 to reflect different levels of power and the like. For example, wall plates 300, 400, 500 may include indicators that may be color coded to indicate different levels of power provided to the wall plate and connectors such as, by way of illustration, red color indicating 100 Watts of POC, yellow color indicating 60 Watts, green color indicating 30 Watts and blue color indicating 15 Watts. Furthermore, the application 152 may be used to schedule the powering-on of the lights of the wall plates 300, 400, 500 depicted in FIGS. 3-5.

In some embodiments, the wall plate circuitry 168 (see FIG. 1) may include a battery backup 175. The battery 175 of the circuitry 168 may provide power to the lights 310, 312, 406, 408 of the wall plates 300, 400, 500, e.g., when the POC or general power supply of the network 100 malfunctions or is turned off. In some embodiments, the battery backup 175 in the wall plate circuitry 168 may be charged with a trickle charge received through the POC function of the network 100.

In some embodiments, the wall plate lights 310, 312, 406, 408 may provide low battery notification by corresponding light indications using various colors or on-off patterns, for instance. In some embodiments, the loss of facility power may trigger one or more wall plates 300, 400, 500, configured as described in FIGS. 3-5, to indicate such loss by various visual indicia such as lighting up or changes in lighting color. In some embodiments, facility emergencies (e.g., fire alarm or hospital room health crisis) may cause such wall plate assemblies to indicate such alarms (e.g., with flashing lights) until the alarm is cleared.

FIG. 6 illustrates an example wall plate 600 having aperture 602 into which removable light assembly 610 may be coupled. Light assembly 610 may be comprised of a connector 614 compatible with aperture 602 and a light source 620. Light source 620 may be tethered to connector 614 by means of a cable 618 (e.g. a flexible, gooseneck-type cable). The light assembly 610 may include a circuitry chamber 612, indicated with a dashed line, which may be housed within a connector 614. The light assembly 610 may further include a battery 616 disposed, for example, inside the circuitry chamber 612. When the light assembly 610 is coupled with a wall plate 600 receiving POC, the battery 616 may receive power, and be charged by wall plate 600, using the POC to wall plate 600. Alternatively, the battery 616 of light assembly 610 may be charged by means of back-up battery 175 disposed on wall plate circuity 168. Once charged, the light assembly 610 may be removed from the wall plate 600 and function as a flashlight, for example. And, of course, wall plate 600 may be additionally configured with the other aspects of wall plates 300, 400 and 500 depicted in FIGS. 3-5 herein including, but not limited to, lights 310, 312, 406, 408, light components 402, 404, 502 and light sensors 308, 410 and 504.

The described embodiments may be implemented in different power provision environments. For example, in addition, or in the alternative, to a POC environment, the described embodiments may be provided in an alternate current (AC) supply network. For example, the described embodiments may provide indication of power presence and/or levels of power in AC-adapted wall plates.

As noted above, application of unwarranted (e.g., excessive) power levels to the cables of one or more of the communication channels comprising network 100 may cause overcurrent and/or overheating and result in a physical damage to the cable. Overheating may mean that a temperature of the cable exceeds a threshold temperature associated with the cable.

Conventional solutions, such as regulating the number of cables allowed in a bundle or close grouping, may not always be sufficient to prevent cable damage due to excess power levels. Accordingly, in addition, or in the alternative, to the embodiments described above, further solutions may be contemplated that provide for safe control and management of power provision in a communications network such as network 100.

For example, in some embodiments, visual indications may be provided by a cable if the cable is carrying an electrical load beyond the rated capability. For example, if a cable is rated at a load of 30 Watts and is actually carrying 60 Watts, the thermal increase in the cable may generate a visual change in the cable jacket color, indicating the cable may no longer operate within the specified and intended limits. This may be achieved by providing a cable jacketing material manufactured using materials that may include thermally-sensitive components such as thermal-reactive pigment, visually temperature-responsive polymer, or thermo-responsive polymer. For example, a LAN cable jacket may be provided with applied thermal-reactive pigment, visually temperature-responsive polymer, or thermo-responsive polymer that changes as the cable temperature increases.

Another approach to managing power provision within a communications network such as network 100 is the limitation or termination of power when power loads exceed pre-set or safe values for one or more communication channels in network 100. FIGS. 7-12 illustrate some example embodiments of devices for protection of communication channels in a communications network. As noted, communication channels may be comprised of a plurality of connectivity elements such as cables, connectors, outlets, and adapters to couple a device (e.g. devices 110-122) and a communications network (e.g. network 100).

Embodiments of circuit protection devices to limit or terminate power transmission in one or more communication channels of network 100, as described in reference to FIGS. 7-12, are illustrative but not limiting to this disclosure. It is understood by those skilled in the electrical arts that such circuit protection devices used to open a circuit of a communication channel may be a fuse or a circuit breaker or a controllable circuit interrupter (collectively, "circuit protection device").

For example, the circuit protection device may be a fuse. A fuse may typically be made from a specialized conductor which is designed to disintegrate or "fuse" at a specific level of current thus opening the circuit it is deployed in and stopping the flow of current in that circuit. These types of fusible links may be incorporated into their own enclosures, which have contacts to be plugged into corresponding sockets. Alternatively, a fuse may be encapsulated in materials such as epoxy and have leads that require soldering on to a printed circuit board (PCB). typically using plated through holes.

In another example, a circuit protection device may utilize a resettable circuit breaker which may be implemented in a number of ways such as an electromechanical circuit breaker. Resettable circuit breakers can operate in the ranges required by POE, POH. A circuit breaker may be selected such that the desired transmission performance can be maintained with, or without, interruption depending on the power load parameters.

In another example, a channel protection device may utilize a controllable circuit interrupter. The advantage of a controllable circuit interrupter is that implementation may include a minimal impact on the transmission performance of the communication channel, compared to the others methods of implementation. The controllable circuit interrupter may be designed such that the circuit may be interrupted for a variety of reasons other than just an over current condition. Such a device may be implemented using electromechanical or electronic relay contacts to provide the means for interrupting the circuit path. The device may be controlled by a dedicated onboard micro-processor and interfaced to other components of an intelligent system such as cable management systems, or more simply "hard wired" to interrupt the circuit due to specific conditions such as over current or over temperature conditions.

As illustrated in FIGS. 7-14, the circuit protection devices described herein may be deployed at any point along the communication channel including in the cables, connectors, and the like, and may protect a portion, or the entire length, of one or more of the communication channels comprising network 100. Such circuit protection devices are intended for use in structured cabling communication channels that deliver POC according to, for instance, standard specifications such as POE or POH. Circuit protection devices are typically deployed to protect the communication channel components although implementation to protect the specific devices coupled to the communication channel may also be possible.

In embodiments, the circuit protection device may be interfaced to an intelligent cable management system. In such system, information and control may be shared between the circuit protection device and the cable management system e.g. computing device 160, power management system 150, computing device 154 (see FIG. 1). For instance, in addition to limiting or terminating the power, a circuit protection device may send a message to the computer device 160 indicating an over-power or over-heating event had taken place and requesting that personnel be dispatched to investigate the problem.

Depending on the type, complexity and overall size of the circuit protection device, it may be deployed directly inside a connector (e.g. a plug or a jack) (see e.g. FIGS. 8-10; 12-13) or, if the circuit protection devices are more complex or require more space, within a separate enclosure (see, e.g. FIGS. 7, 11, 14) connecting into a communication channel using standard connectivity.

Embodiments of circuit protection devices may include devices incorporated into plugs, outlets, and various patch cords. Additional embodiments may include back-to-back couplers and an inline channel protection device with wire pigtails. While specific implementations of communication interconnect devices having circuit protection are disclosed, it is understood by those skilled in the art that such circuit protective devices may pertain to any configuration of a communications interconnecting device having circuit protection components therein.

Regardless of the specific form factor, circuit protection is provided within the specific current path(s) of the communication channel to be protected such that current flow may be limited or terminated to prevent current flow greater than the current rating of the communication channel or some pre-determined current level. In some embodiments, the current flow may be limited or terminated if over-heating is detected at some point along the length of the communication channel or pursuant to any other limiting parameter or setting within the network 100.

Some embodiments of circuit protection devices may comprise field resettable circuit protection devices, including remotely resettable devices, automatically, or by end-user intervention through network 100. Some embodiments of circuit protection devices may have a software-based automatic shut-off and/or resettable component. Other embodiments of circuit protection devices may have fusible components that require manual replacement to be reset. In some embodiments, the entire circuit protection device may require replacement after a circuit is interrupted due to the occurrence of over-current or over-temperature conditions.

Figure 7:
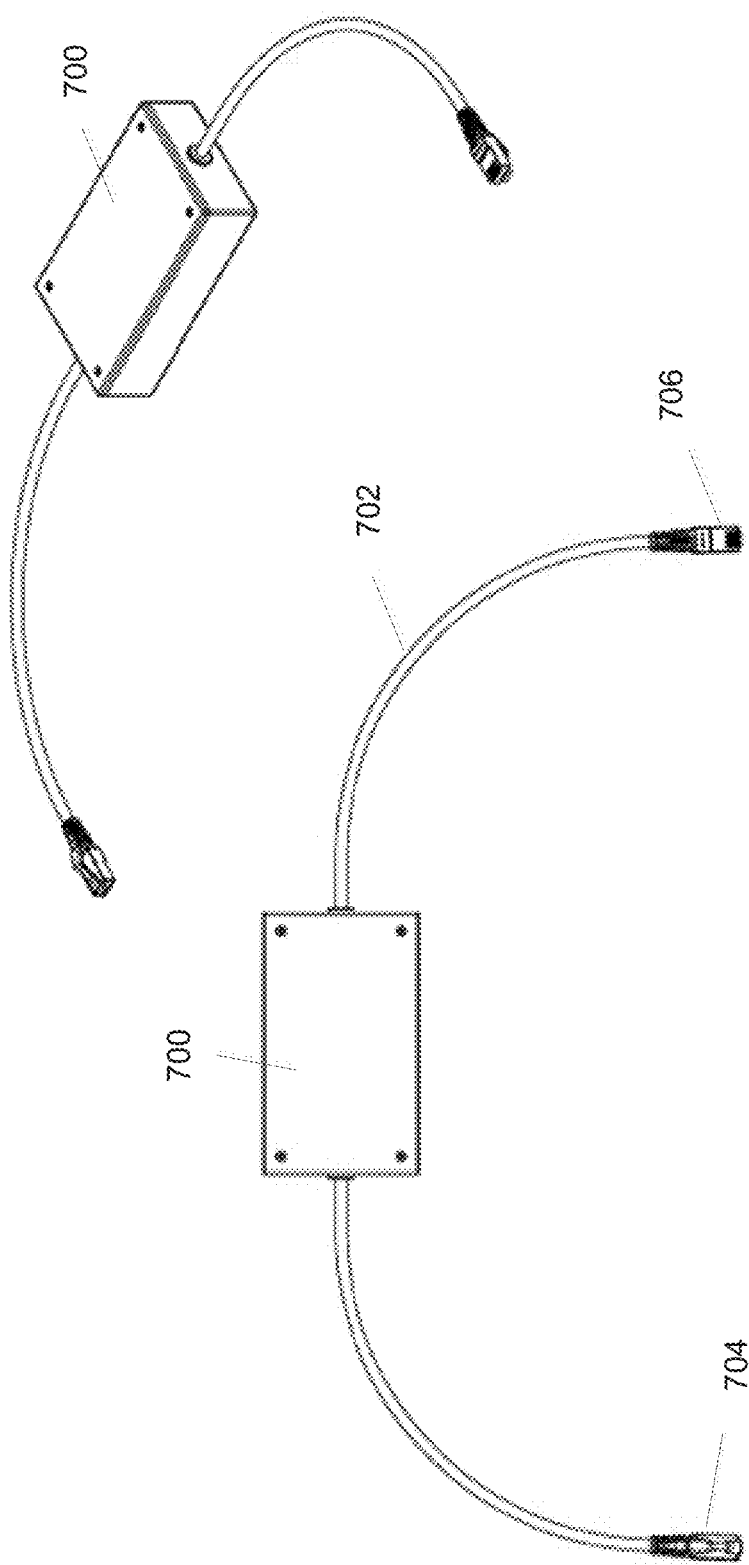
FIG. 7 illustrates an example view of a device for circuit protection in a communications network in accordance with some embodiments.

FIG. 7 illustrates example views of a circuit protection device in a communications network, such as network 100, in accordance with some embodiments. As shown, a circuit protection device (see FIGS. 8-14) may be disposed in housing 700, which may be coupled to the conductive elements of a cable 702 (e.g. twisted wire pair) at some point along the length of cable 702. The circuit protection device disposed within housing 700 may be used to terminate power transmission by means of a circuit break along the communication channel comprised of cable 702 having plugs 704, 706 terminated at opposing ends thereof, which, in turn, may be inserted into the outlets disposed in various wall plates (see e.g., FIGS. 1, 3-5) comprising one or more communication channels of a network 100. The embodiments of the circuit protection device disposed within (such as housing 700), or along, a connectivity element, will be described in reference to FIGS. 8-14 in greater detail.

Figure 8:
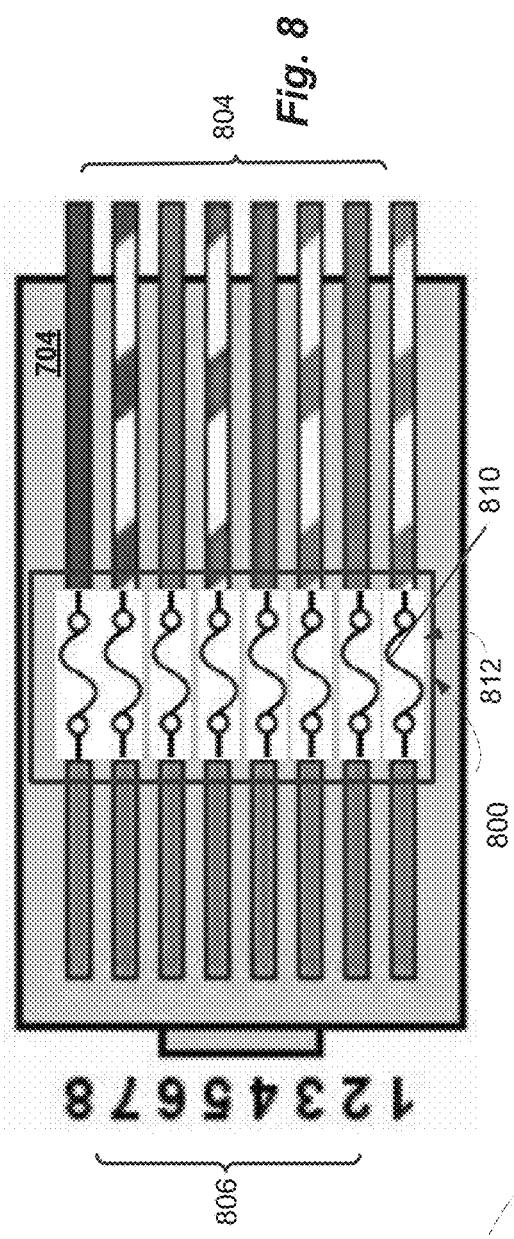
FIG. 8 illustrates an example device for circuit protection, disposed inside a cable connector, in accordance with some embodiments.

FIG. 8 illustrates an example circuit protection device 800 disposed inside a connector 704, in accordance with some embodiments. The diagram shown in FIG. 8 includes the symbol commonly associated with a fuse however it is understood by those skilled in the art the actual circuit protection device may be something other than a fuse e.g., a resettable circuit breaker or controllable circuit interrupter. More specifically, the circuit protection device 800 may be disposed inside a connector 704. The circuit breaker component 800 may be disposed between the conductive elements 804 of a cable terminated to connector 704 and the corresponding mateable contacts 806 at the opposing end of connector 704. The circuit breaker component 800 may include the fuse components 810, such as electric wires configured to physically fuse or break in case of a power overload. The fuse components 810 may be housed in a chamber 812 disposed within connector 704. For example, the fuse components 810 may fuse in response to an overload transmitted across the current carrying components (e.g. cable conductive elements 804, fuse components 810 and contacts 806), that exceeds an overload threshold which effectively terminates power through the communication channel in which the circuit protection device 800 is disposed.

Figure 9:
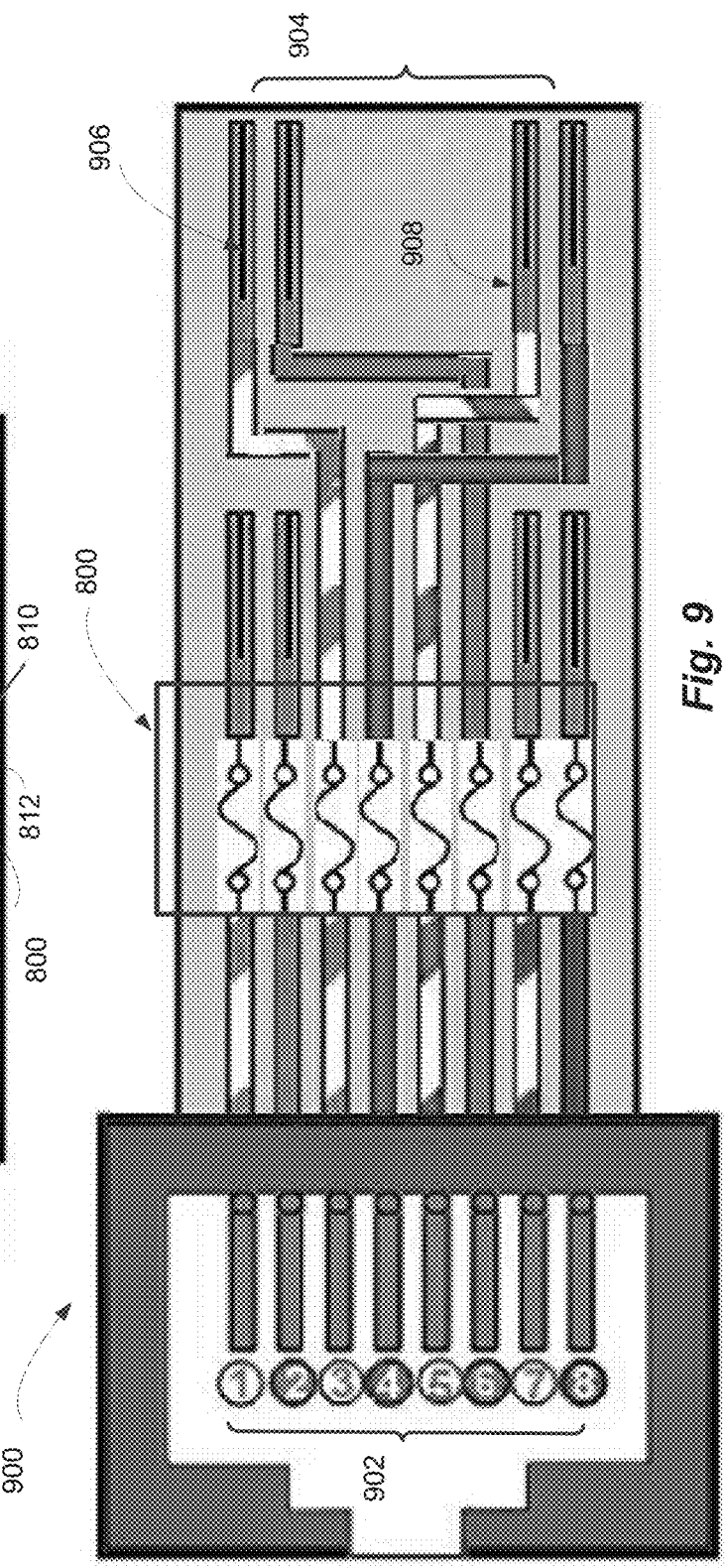
FIG. 9 illustrates an example device for circuit protection, disposed inside a receptacle of a cable connector, in accordance with some embodiments.

FIG. 9 illustrates a circuit protection device disposed inside a connector comprising an outlet 900 in accordance with some embodiments. As described above, the outlet 900 may comprise an outlet of a wall plate assembly, such as outlet 172 or 174 of wall plate assembly 102 or outlets 300, 400, 500 of wall plates 300, 400, 500 (see e.g. FIG. 1; FIGS. 3-5, respectively). As shown, the circuit breaker component 800 may be disposed inside the outlet 900 and configured to break the circuit between the outlet contacts 902 and corresponding cable conductors to be terminated to the rear end 904 of outlet 900 by means of insulation displacement contacts (IDC) 906, 908. The circuit protection device 800 of connector 900 is again shown as a circuit breaker component 800 in a shape of a fuse but, as understood by those skilled in the art, may comprise different types of a circuit breaker device.

Figure 10:
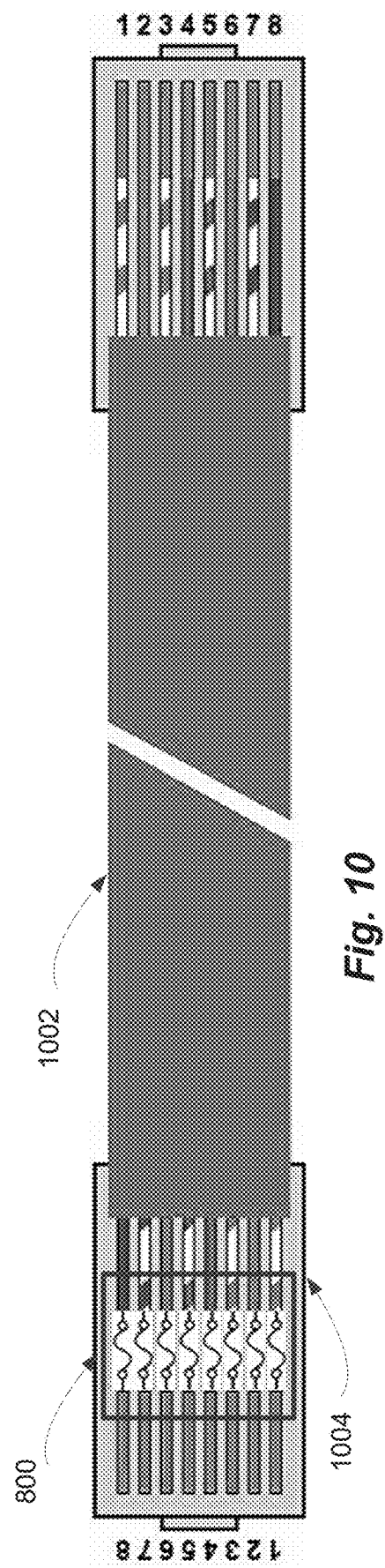
FIGS. 10-11 illustrate an example device for circuit protection, disposed within a cable, in accordance with some embodiments.
Figure 11:
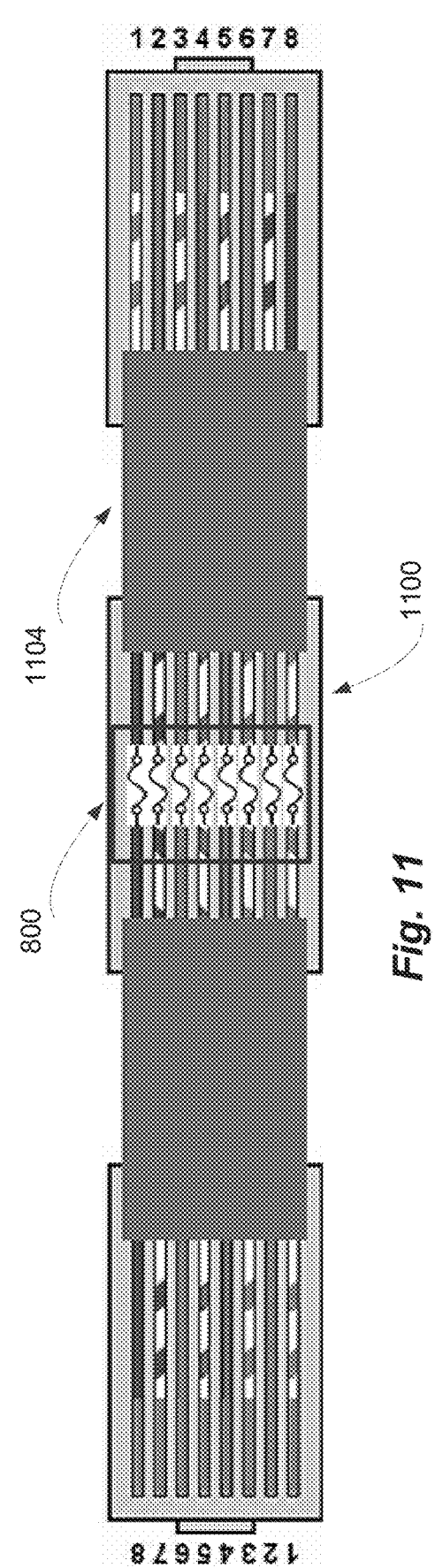

FIGS. 10-11 illustrate an example for a circuit protection device disposed along
the length of patch cords 1002, 1100 in accordance with some embodiments. More specifically, FIGS. 10 and 11 depict diagrams of patch cords 1002, 1100 containing circuit protection devices disposed at various points along the communication channel comprising patch cords 1002, 1100. For instance, the patch cord 1002 depicted in FIG. 10 has the circuit protection device 800 disposed in a plug 1004 terminated to one end of the patch cord 1002 such as that shown in more detail in FIG. 8. In contrast, the patch cord 1104 depicted in FIG. 11 has the circuit protection device 800 disposed in a separate housing 1100 placed at some point along the length of the patch cord such 1100 and similar to cable 702 shown in FIG. 7 with circuit protection device disposed within a separate housing 700.

Figure 12:
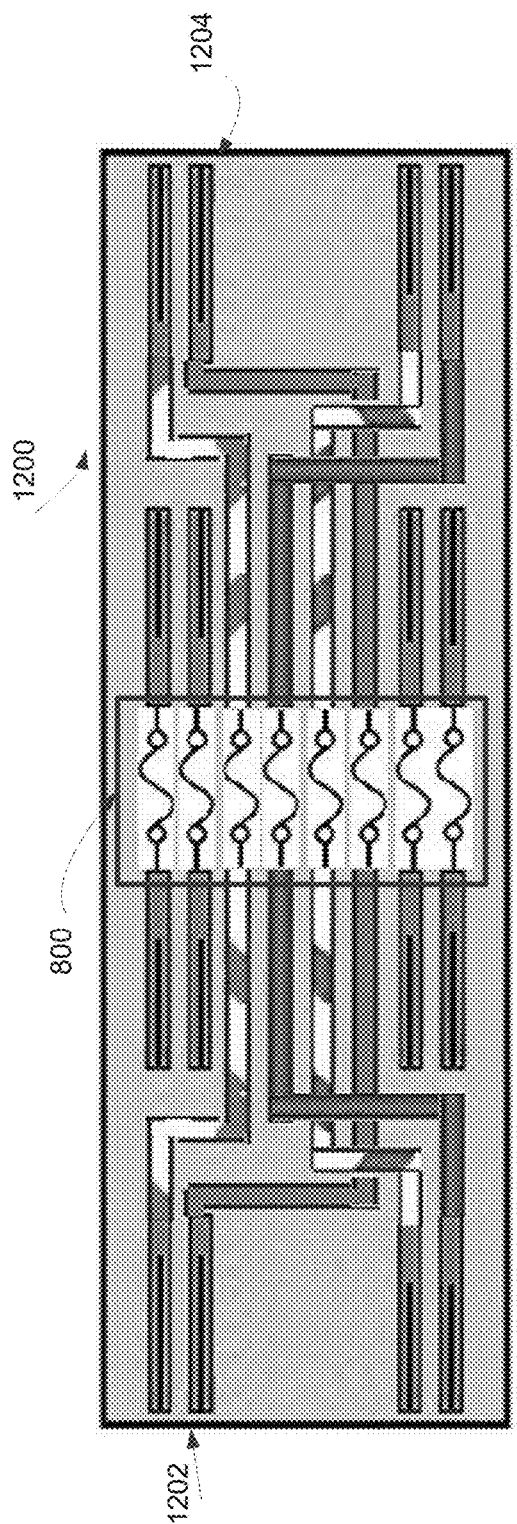
FIGS. 12-13 illustrate an example device for circuit protection, disposed within different connector types, in accordance with some embodiments.
Figure 13:
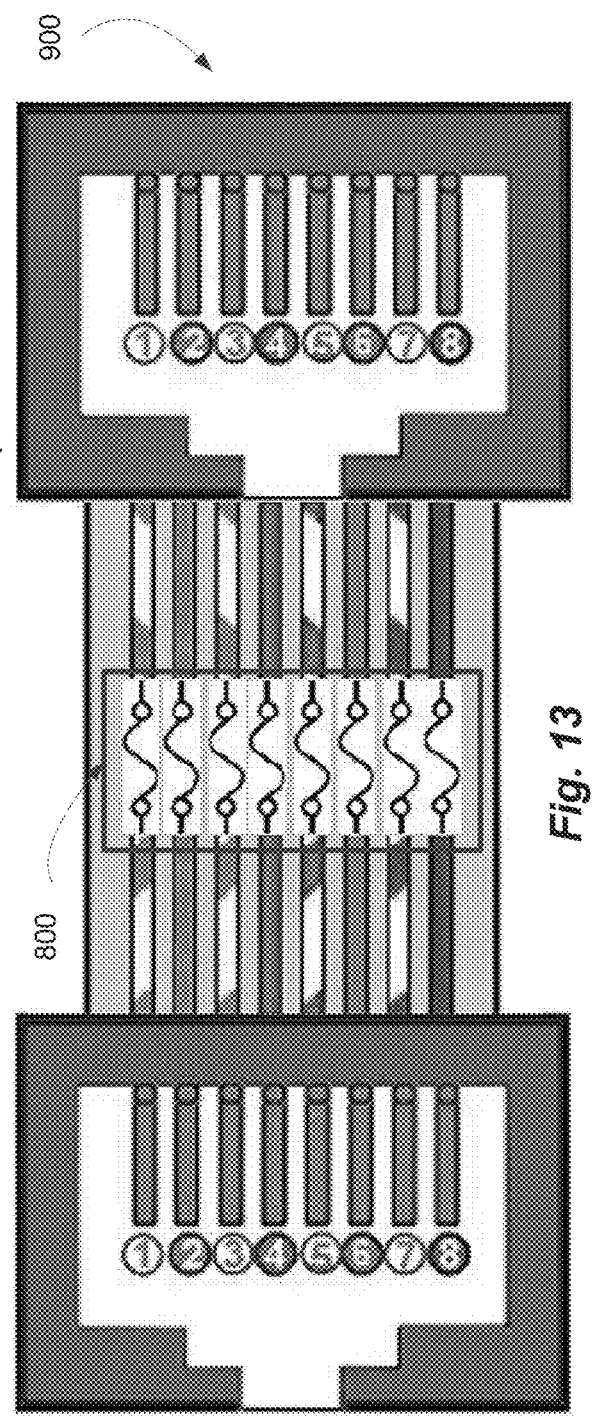

FIGS. 12-13 illustrate an example circuit protection device disposed with
different connector types in accordance with some embodiments. FIG. 12 depicts a diagram of an in-line through connector 1200 having a circuit protection device 800 built into the housing of the connector 1200 having back-to-back punch down male connectors (i.e. plugs) utilizing IDC 1202, 1204 at opposing ends of the connector 1200 to terminate cable conductors. FIG. 13 illustrates a diagram of an in-line through connector 1300 having a circuit protection device 800 built into the housing of the connector 1300, specifically, a back-to-back female connectors (i.e. outlets) having mateable conductive tines disposed within the outlet plug apertures 900 at opposing ends of connector 1300.

Figure 14:
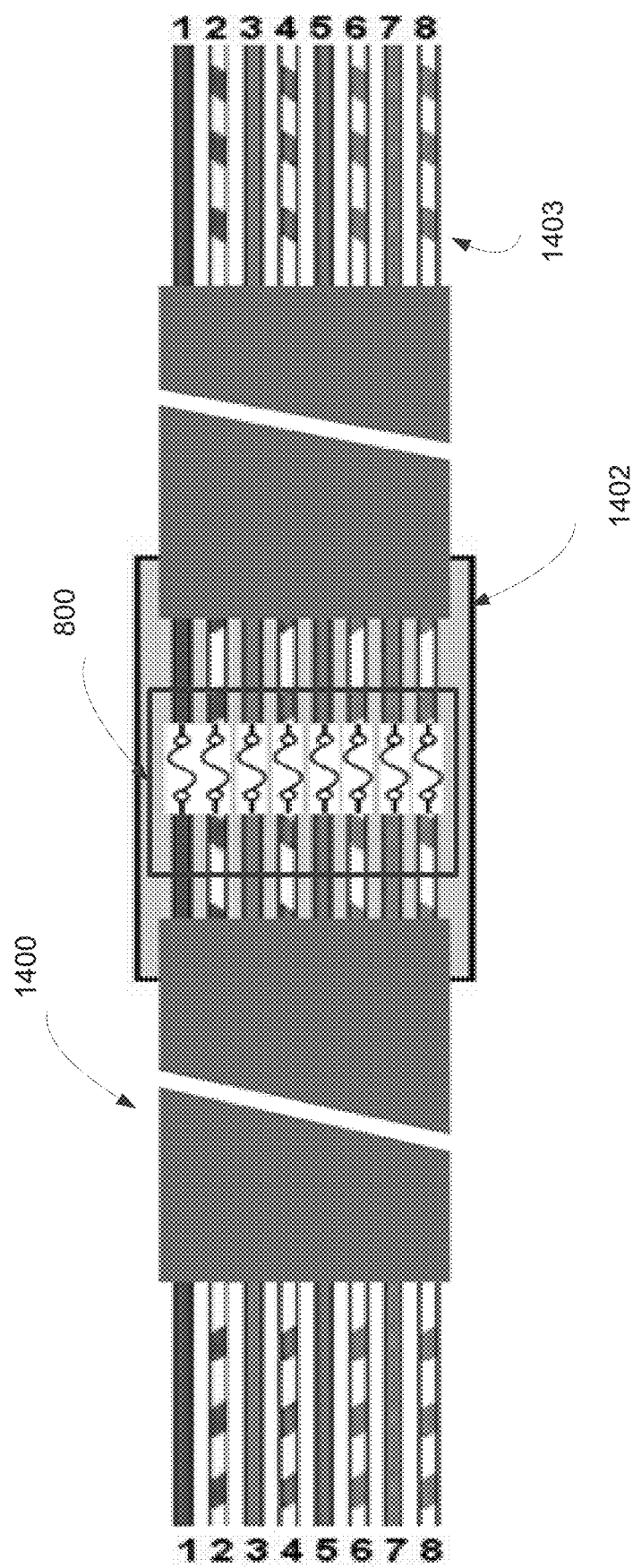
FIG. 14 illustrates a diagram the circuit breaker component disposed in a separate housing, in accordance with some embodiments.

FIG. 14 illustrates a circuit protection device 800 disposed in a separate housing
1402 in accordance with some embodiments. More specifically, FIG. 14 illustrates cable 1400 with a circuit protection device 800 disposed within a separate housing 1402 located at some point along the length of the cable 1400 having connectivity elements 1403 (e.g. the conductive tines of a female connector (e.g. outlet) or the conductive blades of a male connector (e.g. plug)).

Although the circuit protection devices described in reference to FIGS. 8-14 may be deployed at any point along the channel, to effectively provide circuit protection along the entire length of the channel, in some embodiments, the circuit protection device may be placed upstream from the fault causing the overcurrent event. For this reason, the circuit protection device may be most favorably deployed as close to the unit providing power to the channel as possible. The specific structural details of the described circuit protection devices (e.g. fuses, resettable circuit breakers; controllable circuit interrupters) set forth herein are illustrative and it is understood by those skilled in the art that such structural details may be more specifically designed and implemented in such a manner as to maximize performance and minimize negative effects on the performance of transmitted signals along the channels.

The various types of described circuit protection devices may be implemented within the power and signal channels any number of ways. For instance, multi-level circuit protection devices may be implemented to be capable of, for instance, conducting up to 15, 30, 60, 100, 200 watts. Such devices may be permanently placed or reconfigurable, i.e. upgradeable, in the field depending on changes in current within a single or multiple channels. The circuit protection device may be non-resettable (e.g. fuses may be comprised of disintegrating fusible elements). The circuit protection device may be resettable, e.g., circuit breakers that are triggered may be remotely reset, or approved for the power level, remotely by a network administrator. In another example, the device may be a soft-scalable circuit breaker that may be software controlled and soft-scaled from, for instance, 15, 30, 60, 100 to 200 watts, to be able to change the trigger points for circuit interruption and notification to reset or increase the maximum current level of a specific channel.

Various operations are described as multiple discrete operations in turn, in a manner that is most helpful in understanding the claimed subject matter. However, the order of description should not be construed as to imply that these operations are necessarily order dependent. Embodiments of the present disclosure may be implemented into a system using any suitable hardware and/or software to configure as desired.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:
1. A system, comprising:
a network control apparatus comprising communication channels configured to connect one or more devices to a network, wherein the network control apparatus is configured to facilitate data communications between a device, of one or more devices, and the network via a communication channel of the communication channels, and to provide power to the device via the communication channel; and
a power management block coupled to the network control apparatus and configured to control provision of the power to the device,
wherein the power management block is further configured to, in response to a determination that the com- munication channel carries a power level that exceeds a threshold associated with the communication channel, at least one of:
provide an alert indicating that the communication channel carries the power level that exceeds the threshold,
allow the provision of the power to the device at the power level that exceeds the threshold,
decrease the power level to a level below the threshold, or
discontinue the provision of the power to the device.

2. The system of claim 1, wherein
the power management block comprises a switch configured to control the data communications for the device connected to the network,
the switch comprises a port,
the communication channel connects the device to the network via the port, and
the power management block is configured to poll the port to determine the power level provided to the device.

3. The system of claim 1, wherein
the communication channel comprises a wall plate assembly, and
the wall plate assembly is configured to indicate presence of the power on the communication channel.

4. The communications network of claim 3, wherein the wall plate assembly comprises a wall plate with one or more receptacles configured to receive a connector.

5. The system of claim 4, wherein
the wall plate assembly comprises a bezel disposed around at least one of the one or more receptacles, and
the bezel comprises one or more lights disposed on the bezel, the one or more lights configured to indicate the presence of the power on the communication channel.

6. The system of claim 4, wherein
the wall plate assembly comprises a light component disposed substantially around an edge of the wall plate, and
the light component comprises one or more lights configured to indicate the presence of the power on the communication channel.

7. The system of claim 1, wherein
the communication channel further comprises a circuit protection device configured to, in response to at least one of the determination that the communication channel carries the power level that exceeds the threshold or detection of an overheating of a cable, open a circuit comprising the communication channel.

8. The system of claim 7, wherein the circuit protection device is at least one of a fuse, a breaker, or a relay contact.

9. The system of claim 8, wherein
the breaker comprises a resettable breaker,
the resettable breaker is at least one of a manually resettable breaker or an automatic resettable breaker, and
the automatic resettable breaker comprises a breaker resettable by means of a software reset.

10. The system of claim 8, wherein the circuit protection device is disposed inside at least one of the cable, a receptacle, or a connector compatible with the receptacle.

11. The system of claim 7, wherein the circuit protection device is further configured to generate an alert in response to at least one of the determination that the communication channel carries the power level that exceeds the threshold or the detection of the overheating of the cable.

12. The system of claim 1, wherein the network comprises a local area network (LAN) configured to convey data and the power.

13. The system of claim 12, wherein the network is configured to convey the power over Ethernet or power over HDBaseT.

14. The system of claim 1, wherein
the network comprises means for centralized or distributed power sensing, management, and control of the network, and
the means for distributed power sensing, management, and control are disposed throughout the communication channels.

15. A method, comprising:
establishing, by a system comprising a processor, data communications between a device and a network via a communication channel;
delivering, by the system, power to the device via the communication channel;
monitoring, by the system, a power level of the power on the communication channel;
performing, by the system, an action in response to determining that the power level exceeds a threshold value associated with the communication channel, wherein the performing comprises at least one of:
generating an alert indicating that the power level exceeds the threshold value,
allowing delivery of the power to the device at the power level that exceeds the threshold,
decreasing the power level to a level below the threshold value, or
discontinuing the delivering of the power to the device.

16. The method of claim 15, wherein the monitoring comprises monitoring a port of a switch corresponding to the communication channel.

17. The method of claim 15, further comprising, in response to detecting an overheating of a cable corresponding to the communication channel, opening, by the system, a circuit protecting device associated with the communication channel.

18. A network control apparatus, comprising:
a patch panel comprising one or more ports corresponding to respective one or more communication channels;
a switch configured to control data communication to and from one or more devices connected to the one or more ports to yield a network; and
a power management system configured to control provision of power to the one or more devices via the one or more ports,
wherein the power management system is further configured to, in response to determining that a communication channel, of the one or more communication channels, carries a level of power that exceeds a defined level of power, perform an action comprising at least one of:
providing an alert indicating that the level of power exceeds the defined level of power,
allowing the provision of the power via the communication channel at the level of power that exceeds the defined level of power,
decreasing the level of power to a level below the defined level of power, or
discontinuing the provision of the power to the one or more devices via the one or more ports.

19. The network control apparatus of claim 18, wherein
the power management system comprises a switch configured to control the data communication to and from the one or more devices, and
the power management system is configured to poll a port, of the one or more ports, corresponding to the communication channel to determine the level of power carried by the communication channel.

20. The network control apparatus of claim 18, wherein
the communication channel further comprises a circuit protection device configured to, in response to at least one of the determining that the communication channel carries the level of power that exceeds the defined level of power or detection of an overheating of a cable corresponding to the communication channel, open a circuit over which the communication channel provisions the power.

* * * * *